United States Patent [19]

Muhlhoff et al.

[11] Patent Number: 5,749,982
[45] Date of Patent: May 12, 1998

[54] RIM AND ASSEMBLY OF TIRE AND/OR RING-SHAPED TREAD SUPPORT ON SAME

[75] Inventors: Olivier Muhlhoff, Clermont-Ferrand; Jean-Pierre Pompier, Volvic, both of France

[73] Assignee: Compagnie Générale Des Etablissements Michelin - Michelin & Cie, Clermont-Ferrand Cedex, France

[21] Appl. No.: 647,972

[22] PCT Filed: Nov. 22, 1994

[86] PCT No.: PCT/EP94/03873

§ 371 Date: Jun. 3, 1996

§ 102(e) Date: Jun. 3, 1996

[87] PCT Pub. No.: WO95/15863

PCT Pub. Date: Jun. 15, 1995

[30] Foreign Application Priority Data

Dec. 8, 1993 [FR] France .................... 93 14702

[51] Int. Cl.[6] .................... B60B 21/02; B60B 21/10; B60C 3/00; B60C 17/06

[52] U.S. Cl. .................... 152/158; 152/454; 152/520; 152/539; 152/544; 152/548; 152/375; 152/378 R; 152/379.3; 152/379.4; 152/381.3; 152/381.4

[58] Field of Search .................... 152/375, 378 R, 152/379.3, 379.4, 379.5, 381.3, 381.4, 381.5, 381.6, DIG. 9, 376, 382, 383, DIG. 6, 158, 520, 544, 539, 157, 516, 518, 519, 522, 339.1, 340.1, 548

[56] References Cited

U.S. PATENT DOCUMENTS

| | | | |
|---|---|---|---|
| 2,868,258 | 1/1959 | Powers | 152/544 X |
| 3,405,755 | 10/1968 | Verdier | 152/381.3 |
| 4,406,316 | 9/1983 | Okamoto | 152/544 X |
| 4,572,265 | 2/1986 | Lescoffit. | |
| 4,606,390 | 8/1986 | Shute. | |
| 5,139,067 | 8/1992 | Shiozawa et al.. | |

FOREIGN PATENT DOCUMENTS

| | | |
|---|---|---|
| 858514 | 12/1952 | Germany. |
| 2062503 | 5/1981 | United Kingdom. |

Primary Examiner—Adrienne C. Johnstone
Attorney, Agent, or Firm—Baker & Botts, L.L.P.

[57] ABSTRACT

An assembly is formed of a tire (1), a mounting rim (2), and an annular bearing support (3) for the tread (10) of the tire, for running at low pressure or at zero pressure. The rim (2) has two seats (23', 23"), the first seat (23') having an outwardly inclined generatrix and being axially outwardly extended by a shoulder or hump (25'), and the second seat (23") having an inwardly inclined generatrix and being axially outwardly extended by a flange (24). The tire (1) has a radial carcass reinforcement (13) with a particular meridional profile and two beads (12', 12") adapted to the mounting rim (2). The tread supporting ring (3) is ovalizable and circumferentially inextensible.

13 Claims, 2 Drawing Sheets

FIG. I

RIM AND ASSEMBLY OF TIRE AND/OR RING-SHAPED TREAD SUPPORT ON SAME

BACKGROUND OF THE INVENTION

The present invention relates to the production of mounting rims, preferably integral rims, for tires, preferably radial tires, and forming assemblies with the tires and optionally with tread support rings, certain of which may prove useful for running in situations where the inflation pressure is abnormally reduced compared with the nominal pressure of use, termed the operating pressure, the inflation pressure even being capable of becoming zero.

The main difficulties encountered when running flat or at low pressure relate to the risk of unseating the beads of the tire, particularly the risk of unseating the bead situated on the outside of the tire mounted on the off-side of the vehicle. The techniques which have been proposed, and which are well known, for preventing unseating such as this, particularly the technique consisting of providing a shoulder or hump of low height axially inwardly of the outer seat of the rim, tend to increase the difficulties associated with the fitting and removal of tires.

One solution which is intended to be applied to the problem of beads becoming unseated is that described in French Patent 1139619, which relates to an assembly formed from a tire and a rim such that in contrast to the usual beads the flexible edges of the tire exert a tight grip, under the action of the inflation pressure, on rim stops intended to keep the said edges spaced apart from each other. This solution requires a carcass reinforcement which is at least special and which does not comply with the compromise of properties required for a present-day tire.

Certain previous solutions advocate the addition, to a rim as described previously, of a bearing support, which is either integral or is mounted and fixed by any available means. Assemblies comprising rims with a bearing support are known, both with a hump and without a hump, and German Application 3 626 012 and French Application 2 560 121 disclose assemblies such as these. However, they have not been generally used because difficult fitting problems arise despite the progress made. The above-mentioned French Application describes a fitting procedure which enables numerous difficulties to be eliminated: tilting over one of the beads of the tire and ovalizing it enable the rim, which is provided with its bearing support, to pass inside the tire if the rim is offered with its axis of rotation perpendicular to the axis of rotation of the tire casing, the beads subsequently being placed on their respective rim seats with the aid of mounting grooves situated axially on both sides of the bearing support.

If the overall width of the mounting rim measured axially between the ends of the two flanges is termed S, $D_J$ is the diameter of the rim measured at the level of the intersection between the rim flange and the tapered generatrix of the rim seat, the latter being viewed in meridional section, H' is the height of the support measured with respect to the line parallel to the axis of rotation of the rim and passing through the point of intersection, and $D_B$ is the diameter of the bead of the tire measured on a line parallel to the equatorial plane of the tire, which parallel line passes through the center of the bead ring, the method described above is not applicable in the situation where the quantity $2\pi D_B$ is less than $2(D_J + 2H' + S)$, whence it is impossible to provide tires of the usual shape ratio with an effective inside support.

SUMMARY OF THE INVENTION

The present Application relates to solutions which are different from those disclosed in the above-mentioned Application, which similarly enable the conditions of operation and use of a radial tire to be improved when running at zero pressure or at low pressure whilst providing improved protection from impacts due to pavements, the solutions relating both to rims and to the assemblies formed by the rims and tires adapted to such rims, with or without a removable or non-removable tread support ring.

For this purpose, and according to the invention, a rim intended for mounting a tire comprising two reinforced beads, axially delimited by two rim edges which are axially distant from the rim width S, and comprising, viewed axially outwardly in meridional section with respect to the equatorial plane, a first rim seat and a second rim seat, the first rim seat having a generatrix, the axially outer end of which is on a circle of diameter less than the diameter of the circle on which the axially inner end is situated is characterized in that the first rim seat is axially outwardly extended by a shoulder or hump of low height $h_1$, and in that the second rim seat has a generatrix, the axially outer end of which is on a circle of diameter at least equal to the diameter of the circle on which the axially inner end is situated, the second rim seat being axially inwardly extended by a shoulder or hump of low height and axially outwardly by a rim flange, the diameter of the flange being greater than the diameter of any part of the rim included between the flange and the rim edge which is axially nearest to the flange.

With regard to the properties which are sought for the assembly formed by the rim according to the invention and a tire with a structure adapted to the rim, it is advantageous if the assembly comprises a tread support ring. Thus, according to a variant of the invention, the rim may comprise at least one supporting surface intended to receive a tread support ring, disposed axially between the axially inner ends of the two rim seats and having a generatrix, the minimum diameter of which, which is the diameter of one of the ends of the generatrix, is at least equal to the diameter of any part of the rim axially included between the end and the rim edge corresponding to the rim seat which is axially nearest to the end. The supporting surface may be a section of revolution. The diameter of the supporting surface is to be understood as the diameter of the parts of the supporting surface which will be in contact with the bearing support.

A mounting groove which optionally serves for the mounting of the beads on their respective rim seats has a depth and an axial width which is primarily a function of the axial width of the beads and of the inside diameter of the reinforcement rings, bead rings for example, and if applicable of the width of the rim supporting surface intended to receive the bearing support.

In certain cases the depth of the groove may appear excessive, in that it greatly reduces the free space dedicated to mechanical running elements. In the same manner the axial width of the mounting groove is a well known obstacle to the axial widening of the bearing support when it is advantageous to employ the latter.

With the object of minimizing the disadvantages, and according to another variant of the invention, the rim may have two rim seats of different diameters.

In all the cases cited previously, the rim seats preferably have tapered generatrices forming an angle $\alpha'$ between 4° and 30° with the axis of rotation, wherein the angles may be the same or different for the seats.

The rim supporting surface on to which the support ring will be slipped may advantageously be a cylindrical supporting surface; its minimum diameter D may advantageously be equal to the nominal diameter of the rim.

Similarly, it is advantageous to provide a positioning shoulder on its axially inner edge serving as an inner stop for the support ring. The mounting groove may also be disposed between this shoulder and the seat opposite to it, around which the support ring can be slipped.

The axial width L between this positioning shoulder and the axially outer shoulder corresponding to the seat adjacent to the section of revolution is advantageously equal at most to half the maximum width S of the rim between the two rim edges. The height of the shoulder which is axially external to the first rim seat is advantageously equal to at most 1.25% of the nominal rim diameter of the mounting rim.

As regards the shoulder which is axially outwardly adjacent to the first rim seat, its internal wall will preferably be tapered, the wall having a generatrix forming a radially and axially outwardly open angle between 40° and 50° with the axis of rotation of the rim.

An assembly formed by a rim and a support ring is in accordance with the invention when the rim of the assembly is a rim having a supporting surface and as described above, and when the tread support ring can be ovalized and is preferably circumferentially inextensible and can be slipped on to the rim supporting surface.

The maximum effectiveness of the assembly according to the invention is obtained at elevated heights of the bearing support, preferably greater than 40% of the height of the carcass reinforcement. This characteristic provides the advantage of prolonging the period of running flat, namely at zero inflation pressure, without causing damage to the sidewalls of the tire when these are of the usual structure, or damage to the carcass reinforcement or even to the tread reinforcement.

The annular bearing support can easily be slipped on due to the particular characteristics of the mounting rim and if its minimum inside diameter is selected to be at least equal to the minimum diameter D of the rim supporting surface and greater than the diameter by 2 mm at most, its internal generatrix being parallel to the generatrix of the rim supporting surface.

The bearing support, which can be ovalized and which is circumferentially inextensible, preferably consists of vulcanized rubber in annular form, the vulcanised rubber being reinforced by wire or cord reinforcements disposed circumferentially to within 2°. A constitution such as this permits ease of manipulation whilst ensuring inextensibility under all running conditions, particularly under the effect of centrifugal forces due to high speed.

According to the invention, an assembly formed by a rim and a tire is characterized in that it comprises a rim as described previously and a tire having a bead structure adapted to the rim.

A tire intended for the above assembly and having at least two beads is characterized in that the seat of the first bead has a generatrix, the axially outer end of which is on a circle of diameter less than the diameter of the circle on which the axially inner end is situated, whilst the seat of the second bead has a generatrix, the axially outer end of which is on a circle of diameter at least equal to the diameter of the circle on which the axially inner end is situated. The tire advantageously has a radial carcass reinforcement anchored within each bead to a reinforcement ring. When the tire is mounted on the rim and inflated to its operating pressure, the carcass reinforcement has a meridional profile with a constant direction of curvature, at least within the bead intended for mounting on the first rim seat.

The tire intended for the assembly according to the invention preferably has a radial carcass reinforcement, the profile of which, at least within the bead intended for mounting on the first rim seat, has a tangent AT at the point of tangency A with the reinforcement ring of the bead which forms an outwardly open angle $\phi$ of at least 70°, preferably greater than 80°, with the axis of rotation.

If it is preferable that the radial carcass reinforcement of the tire has a direction of curvature which is constant over its entire length, namely between the two points of tangency of the profile at the reinforcement rings, and the tangents of which at the points of tangency with the reinforcement rings form outwardly open angles which are preferably between 70° and 110° with the axis of rotation, the carcass reinforcement may advantageously have, within the bead intended for mounting on the second rim seat, a meridional profile which has a point of inflection I between a part of the profile with convex curvature and a part with concave curvature, the portion of the profile with convex curvature having a tangent at the above point of inflection forming an axially and radially outwardly open angle between 60° and 90° with the axis of rotation.

In a tire which is advantageous for carrying out the invention, the bead seats are tapered and each seat forms an angle between 10° and 45° with the axis of rotation, an angle which is inwardly axially open and outwardly radially open for the bead seat intended for mounting on the first rim seat, and an angle which is axially and radially outwardly open for the bead seat intended for mounting on the second rim seat.

The tip of the bead which is intended for mounting on the first rim seat may be truncated; in other words, the bead seat or base will be joined to the tip side of the bead by a straight segment inclined in relation to a line parallel to the axis of rotation at an angle which is radially and axially outwardly open and which is less than 90°, preferably equal to 45°±5°, the tip of the bead being the part of the bead corresponding to the end of the bead seat which is nearest to the axis of rotation, whilst the heel of the bead is the part of the bead corresponding to the most distant end of the bead seat. The bead heels of the tire according to the invention are also advantageously truncated, the bead seats then being extended axially on the heel side by generatrices forming angles between 40° and 50° with the axis of rotation.

The beads are mounted on the rim, and in particular on the truncated rim seats, with a certain grip. For the assembly considered, this grip is defined as the ratio of the minimum diameter of the rim seat to the minimum diameter of the bead seat. The grip will preferably be at least equal to 1.003, whilst remaining less than 1.02.

Apart from the fact that the assembly according to the invention solves the problem of beads becoming unseated whilst minimising the problems of fitting tires in all the situations which usually arise, the particular structure of the tire, and more particularly of the beads of the tire, provide other advantages.

In practice, if ovalization of the beads of a tire is a necessary operation for the fitting of the said tire, and even though the constitution of certain bead reinforcement rings, particularly bead rings of the "plaited" type, enable ovalization to be effected easily, this manipulation must not exceed certain limits. In particular, ovalization which is too pronounced, which is the case in the prior art described above, seriously affects the rigidity of a bead ring, namely under a tensile force, under a bending force on edge, or under a bending force in its plane, which under some conditions of running of the tire manifests itself as an impairment of the properties of the resistance to unseating.

of the fatigue strength of the beads and of the resistance to blow-outs. These properties are maintained by the invention.

DESCRIPTION OF THE DRAWING

The invention will be better understood with reference to the drawings attached to the description, which illustrate non-limiting examples of a 185/33-16 tire mounted on a rim of diameter equal to 406.4 mm, and where.

DESCRIPTION OF PREFERRED EMBODIMENTS

Figure 1:
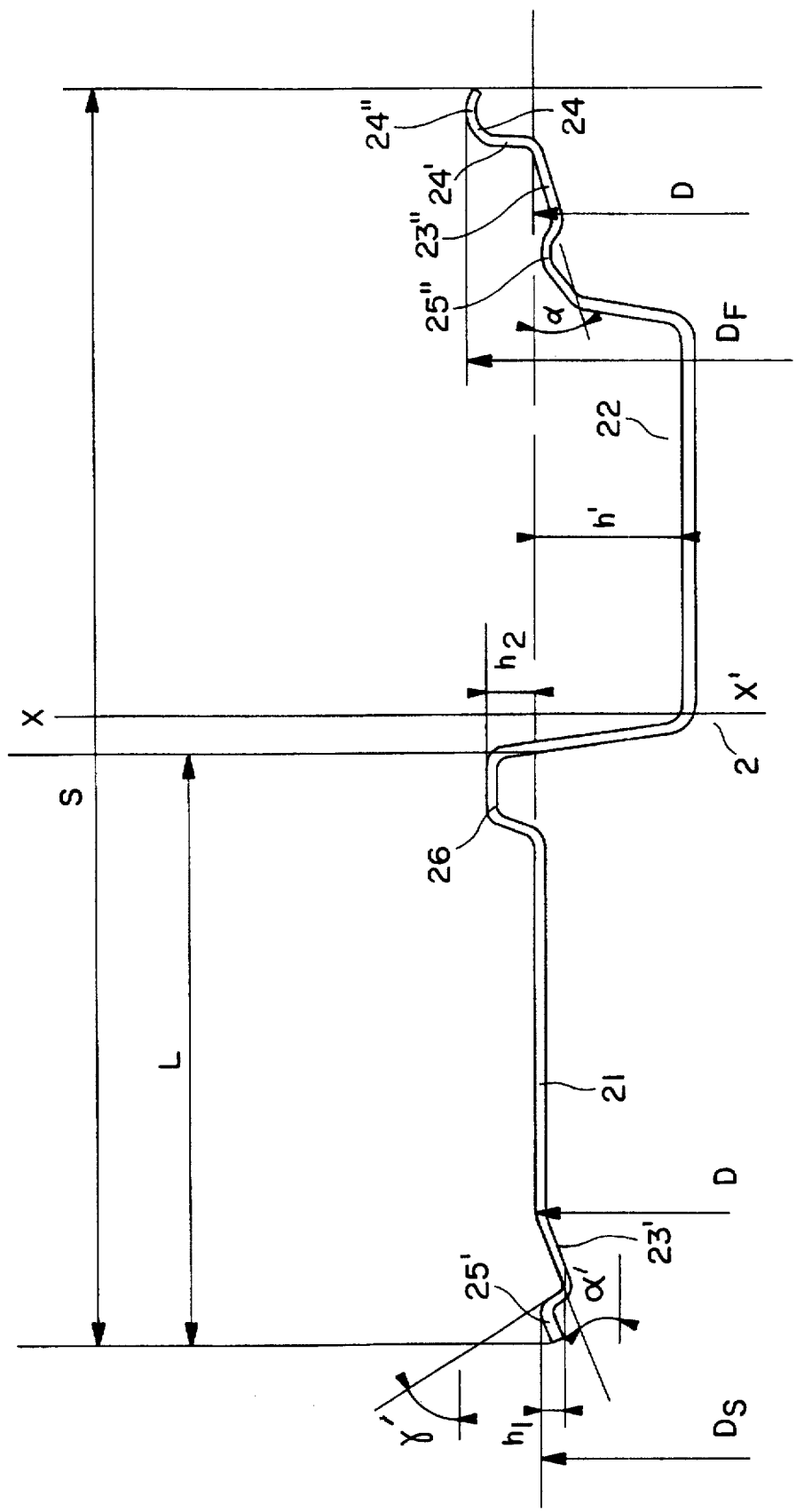
FIG. 1 is a meridional section through a rim according to the invention.

The rim 2, which has a width S measured between its ends which are axially the most distant from the equatorial plane XX', is formed going from one end to the other from a shoulder or hump 25', the inside face or wall of which forms an angle $\gamma'$, which is equal to the angle $\gamma$ of the external face 12A of the tip of the bead 12' of the tire 1, with the axis of rotation of the rim, and the diameter of which $D_S$, which is equal to 402 mm, is less than the inside diameter $D_T$ of the reinforcement ring 14, which in the example described is a bead ring of the "plaited" type (FIG. 3). The height $h_1$, which is measured with respect to the axially outer end of the rim seat 23', is equal to at most 1.25% of the nominal rim diameter D, the nominal rim diameter D being the diameter of the ends of the rim seats which are radially the most distant from the axis of rotation, as is generally accepted in the situation described comprising a rim where the two seats have the same diameter. This nominal diameter is equal to 406.4 mm.

The shoulder 25' is axially inwardly extended by the rim seat 23' which itself is axially adjacent to a section of revolution 21. The section of revolution has a cylindrical generatrix of diameter D, and this cylindrical section is provided axially inwardly with a positioning stop 26, this stop serving, as its name indicates, to position the tread support ring which is to be slipped on to the section of revolution. The height $h_2$ of this stop is equal at most to 1.5% of the nominal diameter D of the rim 2, and in the example described is equal to 5 mm. The axial distance L, measured between the end of the shoulder 25' and the inside face of the stop 26, is equal to 103 mm. This value is less than half the width of the rim 2, which is equal to 215 mm.

The mounting groove 22, which axially extends the section of revolution provided with its positioning stop, has a depth h' of 50 mm, this height h' being measured radially from the axial line defining the nominal diameter D of the rim. The seat 23", which is firstly provided axially inwardly with a shoulder or hump 25" of height equal to 3 mm in the situation described, and which is secondly axially outwardly adjacent to a rim flange 24, completes the rim 2. The seat 23" has a generatrix, the axially inner end of which is on a circle of diameter less than the diameter of the circle on which the axially outer end of the seat 23" is situated, the axially outer end being situated on a circle of diameter D, which is also the nominal diameter and the diameter of the seat 23'. As regards the rim flange 24, this has the known shape of the rim flanges which are usual and which have been standardized by international authorities, namely it is composed of a first part 24' perpendicular to the axis of rotation of the rim, the first part being extended axially and radially outwardly by a second curved part 24". The flange 24 has a diameter $D_F$ of 432 mm, which is greater than the diameter D of the section of revolution.

The two rim seats 23' and 23" have tapered generatrices, which form an angle $\alpha'$ between 4° and 30° with the axis of the rotation of the rim. In the example described this angle is equal to 14°.

Figure 2:
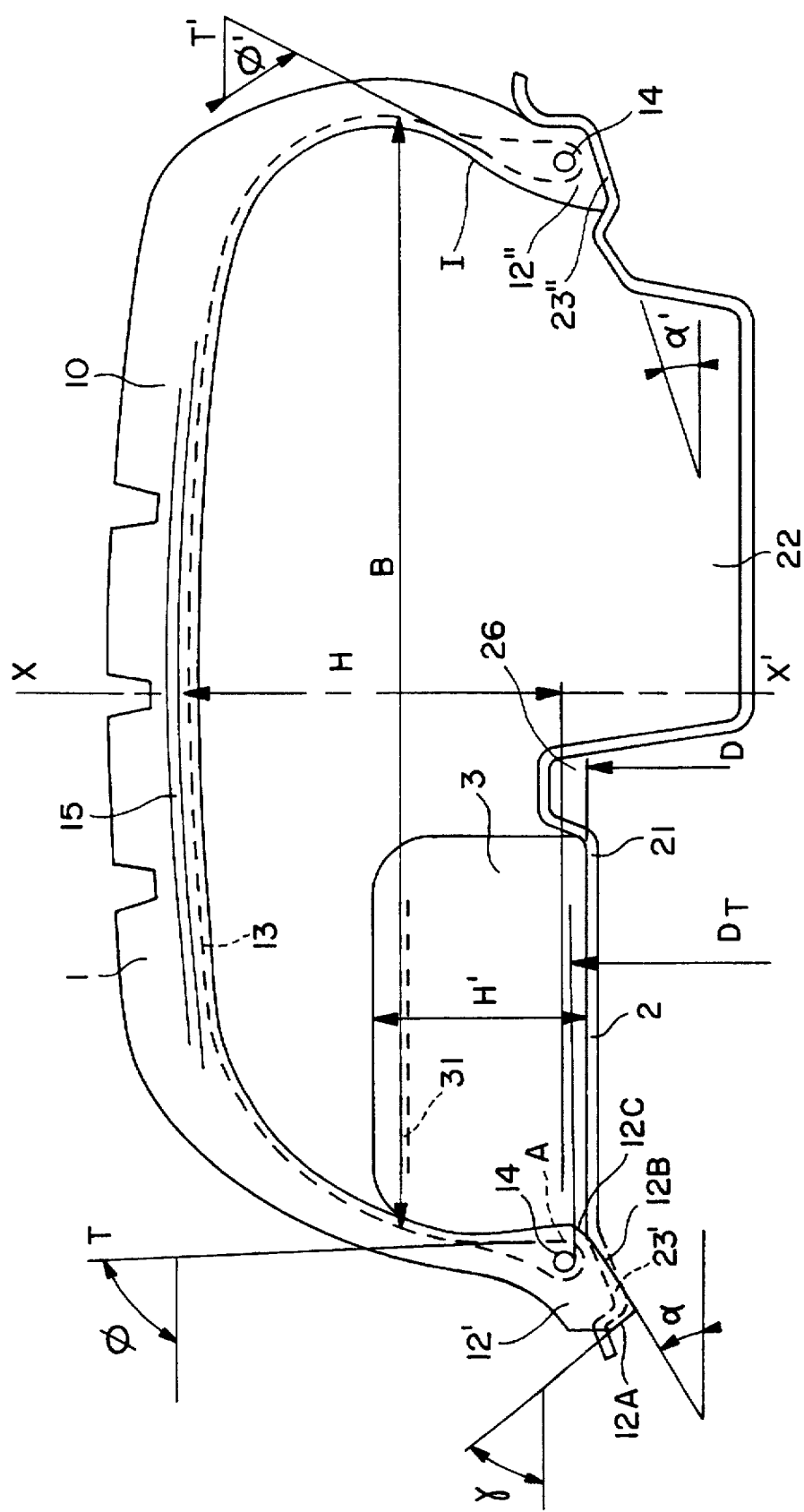
FIG. 2 is a meridional section through an assembly comprising a rim, a tire with an adapted structure and a tread support ring.

In FIG. 2, the assembly E comprises the rim 2 as shown in FIG. 1, a tire 1 having an adapted bead structure, and a tread support ring 3. The tire 1 comprises a tread 10 joined by means of two sidewalls to two beads 12' and 12". It is reinforced by a radial carcass reinforcement 13 formed from a single ply of textile cords anchored within each bead 12', 12" by upturn around a bead ring 14, which in the example illustrated is of the "plaited" type. The carcass reinforcement is topped by a tread reinforcement 15. The tire 1 preferably has a shape ratio equal at most to 0.7, and more particularly less than 0.5. The term "shape ratio" is to be understood as the H/B ratio of the carcass reinforcement, H being the height of the carcass reinforcement 13 and B its maximum axial width. The height H is the radial distance separating the point T of the carcass reinforcement, which is the most distant from the axis of rotation, from the axial line passing through the center of gravity O of the section of bead ring 14 which is nearest to the axis of rotation. In the situation described H is equal to 63 mm, the tire considered having a shape ratio equal to 0.33. The maximum axial width B is equal to 190 mm.

On the side of the assembly corresponding to the first rim seat 23', and within the bead 12', the carcass reinforcement 13 has a meridional profile, the tangent AT of which at point A on the bead ring forms an outwardly open angle $\phi$ of 85°. On the side of the assembly corresponding to the second rim seat 23", and within the bead 12", the carcass reinforcement has a meridional profile which has a point of inflection I. Radially above this point of inflection, the reinforcement profile is convex; radially below this point of inflection, the reinforcement profile is concave and forms a tangent to the bead ring 14 at point A, whereas at point I, the tangent IT' to the meridional profile forms an angle $\phi'$ equal to 75° with the axis of rotation of the tire.

Each bead 12', 12", which has an axial width comparable with the known, usual bead widths, has a bead seat with a tapered base 12B which forms an angle $\alpha$ between 10° and 45° with the axis of rotation. In the situation described this angle is equal to 22° and greater than the angle $\alpha'$, which is the angle of the rim seats. On the side of the assembly corresponding to the first rim seat 23' the bead seat 12B is axially outwardly extended by the outer face 12A of the bead tip, and is axially inwardly extended by a tapered generatrix 12C corresponding to the heel of the bead 12'. On the side of the assembly corresponding to the second rim seat 23" the bead seat 12B is axially outwardly extended by a tapered heel generatrix 12C, whilst the said seat 12B is inwardly axially joined to the inside wall of the tire in the usual manner.

As regards the tread support ring (3), its meridional section has a shape which approximates to that of a rectangle, the radially inner side of which is rectilinear, whilst the lateral sides and the radially outer side may be slightly curved. The difference H' between its internal radius and its external radius is equal to 31 mm, which represents 50% of the height H of the tire (1).

It consists of vulcanized rubber, reinforced radially internally and radially externally, respectively, by a reinforcement (31) consisting of two plies of textile cords oriented at approximately 2°. Since in the situation described the diameter of this support ring is equal to the diameter D' of the section of revolution 21, it can easily be slipped on to the section of revolution.

We claim:

1. A rim (2) intended for mounting a tire (1) comprising two reinforced beads (12', 12"), axially delimited by two rim edges which are axially separated by the rim width S, and comprising, viewed axially outwardly in meridional section with respect to the equatorial plane, a first rim seat (23') and a second rim seat (23"), the first rim seat (23') having a generatrix, the axially outer end of which is on a circle of diameter less than the diameter of the circle on which the axially inner end is situated, the rim characterized in that the first rim seat (23') is axially outwardly extended by a shoulder or hump of low height $h_1$ and in that the second rim seat (23") has a generatrix, the axially outer end of which is on a circle having a diameter at least equal to the diameter of the circle on which the axially inner end is situated, the said second rim seat (23") being axially inwardly extended by a shoulder or hump (25") of low height, and axially outwardly by a rim flange (24), the diameter of the said flange being greater than the diameter of any part of the rim included between the said flange and the rim edge which is axially nearest to the said flange.

2. A rim according to claim 1, characterized in that it comprises at least one supporting surface (21) intended to receive a tread support ring (3), disposed axially between the axially inner ends of the two rim seats (23', 23") and having a generatrix, the minimum diameter of which is at least equal to the diameter of any part of the rim axially included between the said end and the rim edge corresponding to the rim seat which is axially nearest to the said end.

3. A rim according to claim 2, characterized in that the at least one supporting surface (21) includes a supporting surface axially adjacent to the first rim seat (23').

4. A rim according to claim 2, characterized in that the at least one supporting surface (21) is one supporting surface onto which the support ring (3) will be slipped and has a cylindrical generatrix, the minimum diameter D of which is equal to the nominal diameter of the rim, the said supporting surface optionally being provided on its axially inner edge with a positioning shoulder (26) serving as an inner stop for the support ring (3).

5. A rim according to claim 1, characterized in that it comprises at least one mounting groove (22), which at least one groove extends axially inwardly of the second rim seat (23") and its shoulder or hump (25").

6. A rim according to claim 1, characterized in that the rim seats (23', 23") have tapered generatrices forming an angle α' between 4° and 30° with the axis of rotation.

7. A rim according to claim 1, characterized in that the rim seats (23', 23") have tapered generatrices forming angles α' with the axis of rotation which are different from each other.

8. An assembly of a rim (2) and a tread support ring (3), the rim (2) of the assembly comprising, viewed axially outwardly in meridional section with respect to the equatorial plane, a first rim seat (23') and a second rim seat (23"), the first rim seat (23') having a generatrix, the axially outer end of which is on a circle of diameter less than the diameter of the circle on which the axially inner end is situated, the rim characterized in that the first rim seat (23') is axially outwardly extended by a shoulder or hump of low height $h_1$ and in that the second rim seat (23") has a generatrix, the axially outer end of which is on a circle having a diameter at least equal to the diameter of the circle on which the axially inner end is situated, the said second rim seat (23") being axially inwardly extended by a shoulder or hump (25") of low height, and axially outwardly by a rim flange (24), the diameter of the said rim flange being greater than the diameter of any part of the rim included between the said flange and the rim edge which is axially nearest to the said flange, a supporting surface (21) for receiving the tread support ring (3), the supporting surface being disposed axially between the axially inner ends of the two rim seats (23', 23") and having a generatrix, the minimum diameter of which is at least equal to the diameter of any part of the rim axially included between the said end and the rim edge corresponding to the rim seat which is axially nearest to said end, the tread support ring (3) being received on said supporting surface (21), the tread support ring (3) being characterized in that it is circumferentially inextensible and can be ovalized and slipped onto the supporting surface.

9. An assembly of a rim (2) and a tire (1), the rim comprising, viewed axially outwardly in meridional section with respect to the equatorial plane, a first rim seat (23') and a second rim seat (23"), the first rim seat (23') having a generatrix, the axially outer end of which is on a circle of diameter less than the diameter of the circle on which the axially inner end is situated, the rim characterized in that the first rim seat (23') is axially outwardly extended by a shoulder or hump of low height $h_1$ and in that the second rim seat (23") has a generatrix, the axially outer end of which is on a circle having a diameter at least equal to the diameter of the circle on which the axially inner end is situated, the said second rim seat (23") being axially inwardly extended by a shoulder or hump (25") of low height, and axially outwardly by a rim flange (24), the diameter of the said rim flange being greater than the diameter of any part of the rim included between the said flange and the rim edge which is axially nearest to the said flange, said tire having two reinforced beads (12', 12"), the seat of the first bead (12') having a generatrix, the axially outer end of which is on a circle of diameter less than the diameter of the circle on which the axially inner end is situated, while the seat of the second bead (12") has a generatrix, the axially outer end of which is on a circle of diameter at least equal to the diameter of the circle on which the axially inner end is situated, and a radial carcass reinforcement (13) anchored within each bead (12', 12") to a reinforcement ring (14), the said carcass reinforcement having, when the tire is inflated to its operating pressure, a meridional profile with a constant direction of curvature at least within the first bead (12'), the tangent AT of which at the point of tangency A with the reinforcement ring (14) of the first bead (12') forms an outwardly open angle φ of at least 70° with the axis of rotation.

10. An assembly according to claim 9, characterized in that when the tire is inflated to its operating pressure the said carcass reinforcement (13) has a meridional profile, the direction of curvature of which is constant over its entire length, and the tangents AT at the points of tangency A of the said profile with the reinforcement rings (14) of the beads (12', 12") form outwardly open angles φ between 70° and 110° with the axis of rotation.

11. An assembly according to claim 9, characterized in that when the tire is inflated to its operating pressure the said carcass reinforcement (13) has a meridional profile which has a constant direction of curvature within the first bead (12') and the tangent AT of which at the point of tangency A with the reinforcement ring (14) of the first bead (12') forms an outwardly open angle φ of at least 70° with the axis of rotation, and which has a point of inflection I in the second bead (12") which is a transition point from a convex curvature of the said profile to a concave curvature of the said profile, the said portion of the profile with convex curvature having a tangent IT' at the point of inflection I forming an axially and radially outwardly open angle φ' between 60° and 90° with the axis of rotation.

12. An assembly of a rim (2), a tread support ring (3), and a tire (1), the rim comprising, viewed axially outwardly in meridional section with respect to the equatorial plane, a first rim seat (23') and a second rim seat (23"), the first rim seat (23') having a generatrix, the axially outer end of which is on a circle of diameter less than the diameter of the circle on which the axially inner end is situated, the rim characterized in that the first rim seat (23') is axially outwardly extended by a shoulder or hump of low height $h_1$ and in that the second rim seat (23") has a generatrix, the axially outer end of which is on a circle having a diameter at least equal to the diameter of the circle on which the axially inner end is situated, the said second rim seat (23") being axially inwardly extended by a shoulder or hump (25") of low height, and axially outwardly by a rim flange (24), the diameter of the said rim flange being greater than the diameter of any part of the rim included between the said flange and the rim edge which is axially nearest to the said flange, a supporting surface (21) for receiving the tread support ring (3), the supporting surface being disposed axially between the axially inner ends of the two rim seats (23', 23") and having a generatrix, the minimum diameter of which is at least equal to the diameter of any part of the rim axially included between the said end and the rim edge corresponding to the rim seat which is axially nearest to said end, the tread support ring (3) being received on said supporting surface (21), the tread support ring (3) being characterized in that it is circumferentially inextensible and can be ovalized and slipped onto the supporting surface, said tire having two reinforced beads (12', 12"), the seat of the first bead (12') having a generatrix, the axially outer end of which is on a circle of diameter less than the diameter of the circle on which the axially inner end is situated, while the seat of the second bead (12") has a generatrix, the axially outer end of which is on a circle of diameter at least equal to the diameter of the circle on which the axially inner end is situated, and a radial carcass reinforcement (13) anchored within each bead (12', 12") to a reinforcement ring (14), the said carcass reinforcement having, when the tire is inflated to its operating pressure, a meridional profile with a constant direction of curvature within the first bead (12'), the tangent AT of which at the point of tangency A with the reinforcement ring (14) of the first bead (12') forms an outwardly open angle φ of at least 70° with the axis of rotation, and with a point of inflection I in the second bead (12") which is a transition point from a convex curvature of the said profile to a concave curvature of the said profile, the said portion of the profile with convex curvature having a tangent IT' at the point of inflection I forming an axially and radially outwardly open angle φ' between 60° and 90° with the axis of rotation.

13. An assembly according to claim 12, the rim including a mounting groove (22) which extends axially inwardly of the second rim seat (23") and its shoulder or hump (25").

* * * * *